United States Patent Office 3,536,664
Patented Oct. 27, 1970

3,536,664
POLYMERS CONTAINING RANDOM ESTER-ETHER LINKAGES PREPARED FROM DICARBOXYLIC ACID HALIDES, BISPHENOLS AND TRIAZINYL HALIDES AND METHOD FOR PRODUCING SAME
Lewellyn G. Picklesimer, Dayton, Ohio, assignor to the United States of America as represented by the Secretary of the Air Force
No Drawing. Filed July 18, 1968, Ser. No. 745,668
Int. Cl. C08g 17/06, 17/14; C08c 23/00
U.S. Cl. 260—47
4 Claims

ABSTRACT OF THE DISCLOSURE

A series of high molecular weight thermally stable polymers containing random ester and ether linkage within the polymer chain and the process for producing same comprising the reaction of a diacid halide and cyanuric halide in an organic solvent with the alkaline salts of bisphenols in aqueous solution by interfacial polycondensation.

BACKGROUND OF THE INVENTION

Field of the invention

The invention relates to the field of high molecular weight polymers and provides a new polymer system adaptable for use in applications requiring good thermal and hydrolytic stability as is often the case with coatings for fibers and in structural laminates.

Descripition of the prior art

The structural and coating arts in general, especially in aerospace applications where the rapidly advancing technology regularly encounters high temperature environments, are constantly seeking thermally stable materials for a wide variety of structural and mechanical uses. While a great number of such materials have been discovered and are presently in use, there still remains a need for the presentation of other thermally stable materials, the related structural, physical and chemical characteristics of which are such that they will add to the availability of high-temperature substitutes for the wide variety of materials that have been traditionally used where the high temperatures have not been anticipated or encountered.

SUMMARY OF THE INVENTION

The within invention provides a novel thermally stable series of high molecular weight condensation polymers which are characterized by random arrangements of ester and ether linkages within the polymer chain which are also hydrolytically stable and have characteristics which make them amenable to coating and structural laminate applications. The process for the preparation of such polymers involves the reaction of a diacid halide and cyanuric halide in an organic solvent with the alkaline salts of bisphenols in aqueous solution and, more specifically, to the interfacial polycondensation of triazinyl halides and acid halides with polyhydric aromatic compounds.

The invention thus provides a class of new and useful polymers characterized by good thermal and hydrolytic stability characterized by their high molecular weight and the random arrangement of ester and s-triazinyl ether linkages within the polymer chain. The process lends itself to the preparation of a wide variety of polymeric materials thorugh the careful selection of the diacid halide or halides to be used in the organic phase with cyanuric halide. By careful selection of diacid halides that have approximately the same rate or reactivity as the cyanuric halide such as cyanuric chloride or cyanuric bromide, a random polymer is produced. If the reactivity of the diacid halide varies appreciably from that of cyanuric halide, a polymer having a block structure wherein the most reactive monomer enters the condensation reaction first will be produced. Although in certain instances, it has been discovered that some of the diacid halides produce weak and unsatisfactory films, the addition of a small amount of cyanuric halide to the organic phase strengthens the polymeric film to the point whre it can be removed and will have vastly improved strength. It has also been found that the properties of the polymer may be varied by the use of two or more carefully selected polyhydric compounds in the aqueous phase.

Suitable polyhydric aromatic compounds have been found to be hydroquinone, 4,4'-dihydroxy-biphenyl, 2,2-bis(p-hydroxyphenol)propane and 1-3-dihydroxy benzene, the requirements for such compounds being that they have at least two hydroxyl groups and the alkaline salts thereof are soluble in water. Suitable diacid halides for use with the cyanuric halide in the organic phase have been found to be terephthalyl chloride, isophthalyl chloride, adipoyl chloride, sebacoyl chloride, succinyl chloride, terephthalyl bromide, terephthalyl iodide and the remainder of the series of diacid halides, so long as the particular one chosen is soluble in the selected organic solvent. Suitable organic solvents in which to react the diacid halide and the cyanuric halide include tolene and the chlorinated solvents such as ethylene dichloride, chloro-benzene, orthodichlorobenzene, 1,1,1-trichloro ethane, the requirement being however that the organic solvent selected is one which is immiscible with water.

Upon the addition of the organic solution to the aqueous solution as by pouring the former upon the latter in a container, the polymer forms as an opaque white film at the interface of the two liquids and can be easily removed, simply by pulling the same from the container. To apply the polymer as a coating to a filament such as a spun glass thread, the thread may simply be drawn vertically through the two solutions whereby it will pick up the polymer as an adhered coating thereon. Another manner in which the polymer may be employed is in high temperature laminates where for example the polymer may be softened at elevated temperatures of on the order of up to 900° Fahrenheit and placed between layers of glass which, upon the application of pressure concurrent with the maintenance of the softening temperature, will result in an integrated laminated structure.

DESCRIPTION OF THE PREFERRED EMBODIMENTS

One preferred embodiment of the composition of matter and process of the present invention comprises the dissolving of 3.68 grams (0.02 mole) of cyanuric chloride and 4.06 grams (0.02 mole) of terephthalyl chloride in 150 milliliters of an organic solvent such as toluene which is then added to an aqueous solution of 7.44 grams (0.04 mole) of 4,4'-dihydroxybiphenyl and 3.20 grams (0.08 mole) of sodium hydroxide in 100 milliliters of water. Upon the addition of the organic solution to the aqueous solution as by pouring the former upon the latter in a beaker, an opaque white film forms readily at the interface of the two liquids and can be easily removed. After washing with water and acetone, the film is mechanically stable and does not melt when exposed to temperatures of up to 900° Fahrenheit as for example by being placed upon a hot plate at that temperature.

Another embodiment of the invention involves the dissolving of 3.68 grams (0.02 mole) of cyanuric chloride and 3.10 grams (0.02 mole) of succinyl chloride in 100 milliliters of toluene and carefully floating this solution upon an aqueous solution composed of 7.44 grams (0.04 mole) of the 4,4'-dihydroxybiphenyl and 3.20 grams (0.08 mole) of sodium hydroxide in 100 milliliters of water. While the film forms readily at the interface of the two solutions at room temperature, when the solutions are heated to approximately 70° centigrade, the polymer may be pulled rapidly from the interface. Again the polymer is an opaque white film which does not melt upon subjection to temperatures of up to 900° Fahrenheit. By way of demonstrating the unobviousness of the polymer formation according to this invention, under the same reaction conditions, the succinyl chloride and 4,4'-dihydroxybiphenyl do not form a film which can be removed from the interface.

In still another embodiment of the invention, 3.72 grams (0.02 mole) of 4,4'-dihydroxybiphenyl, 4.56 grams (0.02 mole) of 2,2-bis(p-hydroxyphenyl)propane and 3.20 grams (0.08 mole) of sodium hydroxide are dissolved in water; and 3.68 grams (0.02 mole) of cyanuric chloride and 4.06 grams (0.02 mole) of terephthalyl chloride are dissolved in 200 milliliters of toluene. The toluene solution is then carefully added to the aqueous solution whereupon a film forms immediately which, although it is somewhat tender at the outset, becomes tough and clear after allowing to stand for approximately five minutes.

In still another embodiment of the invention, 4.06 grams (0.02 mole) of terephthalyl chloride and 3.68 grams (0.02 mole) of cyanuric chloride dissolved in 200 milliliters of toluene are carefully floated upon a basic aqueous solution of 4.56 grams (0.02 mole) of 2,2-bis(p-hydroxyphenyl)propane and 2.20 grams (0.02 mole) of hydroquinone dissolved in 200 milliliters of water whereupon a tough flexible film is rapidly formed at room temperature. The polymer thus formed may be drawn from the interface as collapsed tubes.

In still another embodiment of the invention, 3.68 grams (0.02 mole) of cyanuric chloride and 3.10 grams (0.02 mole) succinyl chloride dissolved in 200 milliliters of toluene may be floated upon an aqueous basic solution of 4.40 grams (0.04 mole) of hydroquinone and 3.20 grams (0.08 mole) of sodium hydroxide in 200 milliliters of water. The polymer film forming rapidly at room temperature may be drawn continuously at approximately 30° centigrade.

In yet another embodiment of the invention, 3.68 grams (0.02 mole) of cyanuric chloride and 3.66 grams (0.02 mole) of adipoyl chloride dissolved in 200 milliliters of toluene are added to an aqueous base solution composed of 4.40 grams (0.04 mole) of hydroquinone and 3.20 grams (0.08 mole) of sodium hydroxide in 200 milliliters of water whereupon a film will form rapidly at room temperature. At 50° centigrade this same polymeric film may be drawn rapidly and continuously from the interface of the two solutions as a collapsed tube.

In yet another embodiment of the invention, a solution composed of 2.68 grams (0.02 mole) of cyanuric chloride and 4.76 grams (0.02 mole) of sebacoyl chloride dissolved in 200 milliliters of toluene may be similarly added to a basic aqueous solution of 4.40 grams (0.04 mole) of hydroquinone and 3.20 grams (0.08 mole) of sodium hydroxide in 200 milliliters of water whereupon a polymeric film may be continuously drawn from the solution interface at room temperature.

Yet another embodiment of the present invention involves the dissolving of 9.2 grams (0.05 mole) of cyanuric chloride and 10.1 grams (0.05 mole) of isophthalyl chloride in 300 milliliters of toluene and the careful addition of this solution to a basic aqueous solution composed of 18.6 grams (0.10 mole) of 4,4'-dihydroxybiphenyl and 8.0 grams (0.20 mole) of sodium hydroxide in 300 milliliters of water. The film thus formed at the solution interface may be removed at room temperature and the film as collapsed tubes of the polymer may be removed at approximately 70° centigrade.

In yet another embodiment of the invention, 9.20 grams (0.05 mole) of cyanuric chloride and 10.1 grams (0.05 mole) of terephthalyl chloride in 300 milliliters of toluene may be poured into a 100 milliliter reaction flask fitted with an efficient stirrer and thermometer. The basic aqueous solution composed of 18.6 grams (0.10 mole) of 4,4'-dihydroxybiphenyl and 8.0 grams (0.20 mole) of sodium hydroxide dissolved in 300 milliliters of water may then be added to the reaction flask with rapid stirring whereupon almost instantaneous polymerization will take place with a temperature rise to approximately 40° centigrade. To obtain a quantative yield, the white polymer may be thoroughly washed with boiling water and then toluene and dried for approximately twelve hours at 130° centigrade.

In all of the foregoing examples, it has been found that the diacid halides alone do not form a polymeric film with the bisphenols of sufficient molecular weight to be removed from the reactive interface unless sufficient cyanuric halide to increase the molecular weight is also included. All of the polymers resulting from the above examples contain the random ester and ether linkages within the polymer chain, are characterized by high molecular weights and have the general structure:

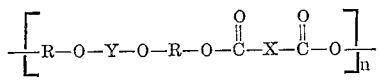

wherein R is selected from the group consisting of phenylene, biphenylene, and 2,2-diphenylenepropane, X is selected from the group consisting of phenylene, ethylene, tetramethylene and octamethylene, Y is the s-triazine nucleus and $n$ is a whole number integer.

While the within invention has been described in connection with certain specific embodiments thereof, the foregoing particularization and detail have been for the purpose of illustration only and do not limit the scope of the invention as defined in the appended claims.

The invention described herein may be manufactured and used by or for the United States Government for governmental purposes without payment to me of any royalty thereon.

I claim:

1. As a new composition of matter, a high molecular weight thermally stable film forming polymer characterized by a random arrangement of ester and ether linkages within the polymer chain consisting essentially of the recurring unit:

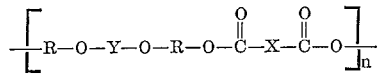

wherein R is selected from the group consisting of phenylene, biphenylene, and 2,2-diphenylenepropane, X is selected from the group consisting of phenylene, ethylene, tetramethylene and octamethylene, Y is selected from the group consisting of a monochloro substituted S-triazine nucleus and a monobromo substituted S-triazine nucleus and $n$ is a whole number integer.

2. A method for the synthesis of a high molecular weight thermally stable polymer characterized by random ester and ether linkages within the polymer chain comprising the steps of dissolving in an inert organic solvent a diacid halide selected from the group consisting of terephthalyl chloride, isophthalyl chloride, adipoyl chloride, sebacoyl chloride, succinyl chloride, terephthalyl bromide, and terephthalyl iodide and a cyanuric halide selected from the group consisting of cyanuric chloride and cyanuric bromide, dissolving an alkali and a bisphenol in water and of adding one solution to the other wherein the selection of the bisphenol is such that the alkaline salt thereof will be soluble in water and the organic solvent is immiscible with water whereby an interface will exist between the two solutions at which polycondensation of the cyanuric halide and acid halide with the bisphenol occurs to form the polymer and from which the polymer so formed may be withdrawn.

3. A method according to claim 2 wherein said organic solvent is one of that class which consists of toluene, ethylene dichloride, chlorobenzene, orthodichlorobenzene and 1,1,1-trichloroethane.

4. A method according to claim 2 wherein said diacid halide is terephthalyl chloride, said cyanuric halide is cyanuric chloride and said bisphenol is 4,4'-dihydroxybiphenyl.

References Cited

UNITED STATES PATENTS

| 3,297,639 | 1/1967 | Picklesimer | 260—61 |
| 3,351,611 | 11/1967 | Conix | 260—47 |
| 3,351,624 | 11/1967 | Conix | 260—47 |

WILLIAM H. SHORT, Primary Examiner

L. L. LEE, Assistant Examiner

U.S. Cl. X.R.

117—124, 161; 260—29.2, 33.6, 33.8, 61